April 10, 1928.  1,665,570
L. W. WATERS
ELECTRIC WINDSHIELD WIPER
Filed Feb. 19, 1927
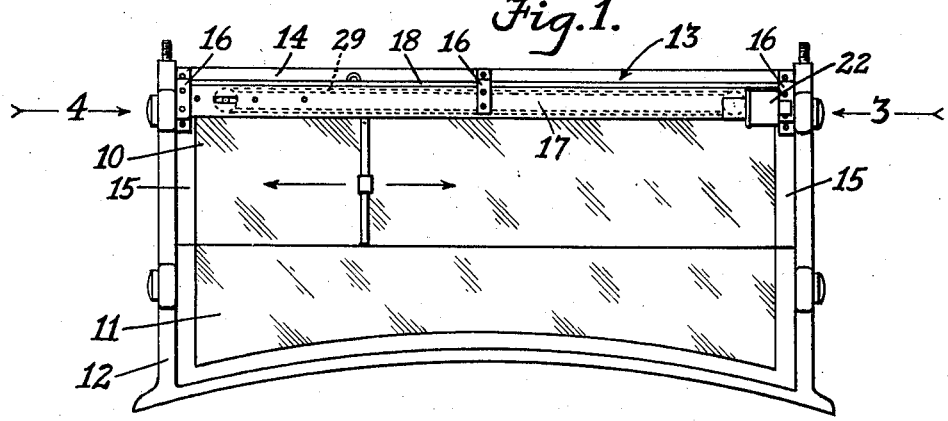
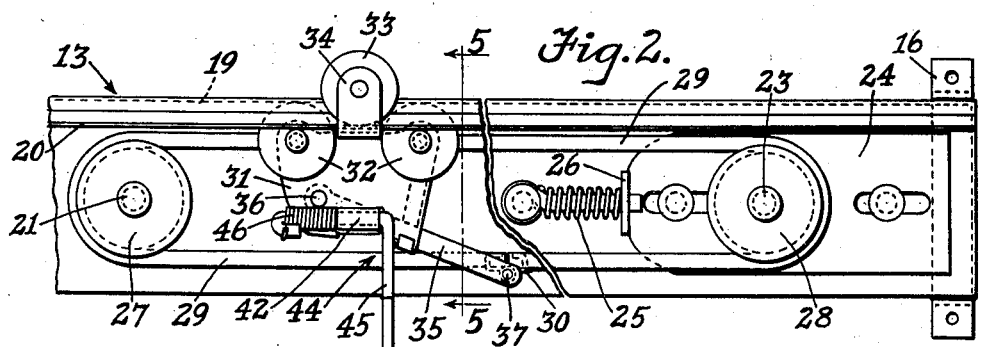
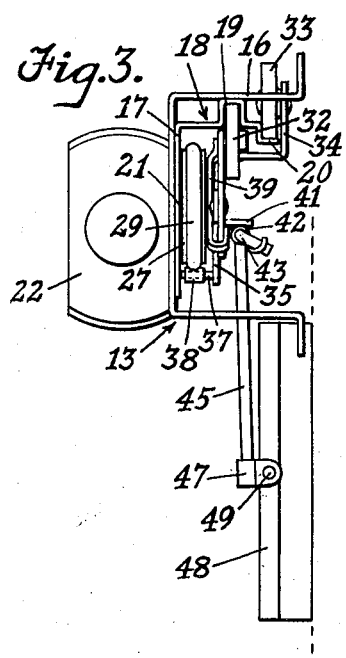
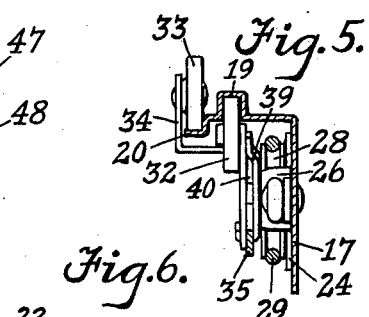
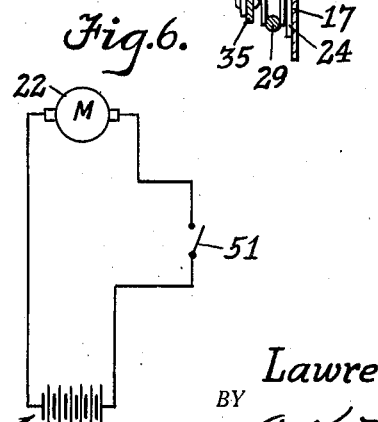
INVENTOR,
Lawrence W. Waters
BY
A. K. Martell
ATTORNEY.

Patented Apr. 10, 1928.

1,665,570

UNITED STATES PATENT OFFICE.

LAWRENCE W. WATERS, OF LOS ANGELES, CALIFORNIA.

ELECTRIC WINDSHIELD WIPER.

Application filed February 19, 1927. Serial No. 169,525.

My invention relates to automobile accessories and more particularly to an electrically operated wiper for automobile windshields.

The primary object of my invention is to provide a windshield wiper which may be fixed on the windshield frame so that it will sweep over practically the whole of the outer surface of the upper glass therein and keep it free from moisture or dust which may obscure a driver's view of the road or street on which he is driving.

A further object is to produce a windshield wiper of the character described which is electrically operated and which may be started or stopped by the mere closing or opening of a switch.

Other objects and advantages will appear hereinafter and while I show herewith and will describe a preferred form of construction I desire it to be understood that I do not confine my invention to such preferred form but that various changes and adaptations may be made therein without departing from the spirit of my invention as hereinafter claimed.

Referring to the accompanying drawings, which form a part of this specification, Fig. 1 is a front view of a windshield having a wiper, embodying the principles of my invention, mounted thereon.

Fig. 2 is an enlarged fragmentary view of the windshield wiper shown in Fig. 1, showing its main features as seen from the rear side thereof.

Fig. 3 is an enlarged end view of my windshield wiper as seen when looking in the direction indicated by arrow 3 in Fig. 1.

Fig. 4 is a similarly enlarged end view of my windshield wiper as seen when looking in the direction indicated by arrow 4 in Fig. 1.

Fig. 5 is a sectional view of the windshield wiper shown in Fig. 2, this section being taken on line 5—5 of that figure.

Fig. 6 is a wiring diagram illustrating, in conventional form, the electrical apparatus used for operating my windshield wiper and the method of connecting same in an electric circuit.

It will be seen that my windshield wiper may be adapted for use on any of the various types of windshields found on the many different makes of automobiles, the type shown in Fig. 1 of the drawings, by way of illustration, being one of the most common.

It consists of an upper section 10 and a lower section 11 pivotally fixed at their ends in a common supporting frame 12.

The supporting element of my windshield wiper is an elongated hood or housing 13 extending approximately the full length of the windshield, to the upper rail 14 and stiles 15 of which it is attached by brackets 16; the hood being made preferably of sheet metal and the brackets of flat bar-iron, bent into suitable forms and bolted or riveted thereto. The general form of the hood, in cross-section is, that of angle iron, with one flange extending vertically to form the front wall 17 thereof and the other flange extending horizontally to form the roof 18, the rear side thereof being closed by that part of the windshield to which it is attached and the lower side being left open. Roof flange 18 is bent longitudinally to form a groove 19 in its under side, in parallel spaced relation to rail 14 of the windshield and also to form an offset flange 20, in parallel spaced relation to said rail 14 and to said groove 19.

A stub shaft 21, journaled in wall 17, of the housing, adjacent one end thereof, is geared to a small electric motor 22 mounted on the outer side of wall 17, said motor being completely enclosed in a casing to protect it from the weather. A pivot-pin 23 is fixed in a spring-controlled slidable plate 24 which is attached to the inner side of front wall 17, at the opposite end of the housing from stub-shaft 21, so as to have limited movement toward and away from stub-shaft 21, said pivot pin 23 being maintained in parallel relation to said stub-shaft 21. Slidable plate 24 is impelled to move to its remotest distance from stub-shaft 21 by a compressed helical spring 25 fixed to said front wall 17 so as to act against a lug 26 formed on one end of said plate 24.

A drive pulley 27 is fixed on stub-shaft 21, within front wall 17 of housing 13. A similar pulley 28 is mounted on pivot pin 23, in alignment with pulley 27, so that both turn in the same vertical plane, and an endless belt 29 is run over pulleys 27 and 28, the ends of said belt 29 being joined by a fastener 30.

A carriage plate 31, having a pair of spaced rollers 32 pivoted thereon so as to run in groove 19 and an intermediate roller 33 pivoted on an angular extension or arm 34, formed integral therewith, so as to run on the outer sides of flange 20, is suspended within housing 13 so that it may travel from end to end thereof adjacent belt 29. Carriage plate 31 is connected to belt 29 by a pivoted arm 35, one end of which is attached to said carriage plate 31 by a pivot pin 36 and the other end of which is equipped with a pivot pin 37 which turns in a sleeve 38 fixed on fastener 30 of the belt. A guide-bar 39 is fastened on the side of carriage plate 31 adjacent belt 29, to which arm 35 is also attached, so as to form a guide slot 40 in which said arm 35 may move as the end thereof which is attached to belt 29 swings from one side to the other of pulleys 27 and 28.

A right angled lug 41 is formed on the opposite side of carriage plate 31 from that to which arm 35 is attached and a bearing sleeve 42 is formed or fixed thereon, said bearing sleeve extending longitudinally of housing 13. The shorter end 43 of a right-angled arm 44 is inserted in this bearing sleeve so that its longer end 45 extends downwardly at right angles to housing 13. The projecting part of shorter end 43 is equipped with a spring 46 which tends to swing longer end 45, of said right-angled arm 44 toward the wind-shield, as indicated by the arrow in Fig. 3. A terminal lug 47 is fixed on longer end 45 of right angled arm 44, and a squeegee 48 or other suitable wiper is pivotally attached, as at 49, to said terminal lug 47.

The operation of my windshield wiper readily will be understood by reference to Figs. 2, 3 and 6. As illustrated in the latter figure the motor 22 is connected to a generator 50 through a switch 51 which may be mounted on the instrument board within easy reach of the driver. Upon closing the switch the motor operates to drive belt 29, through pulley 27, and carriage plate 31 is caused to travel from end to end of housing 13 by arm 35 which connects it to belt 29. Arm 44 being attached to carriage plate 31 causes squeegee 48 to sweep over the outer surface of the upper glass in the windshield, spring 46 operating to keep said squeegee pressed against the glass at all times.

While no provision for reducing friction is shown in the drawings, in actual practice pulleys 27 and 28 and rollers 32 and 33 will be equipped with ball bearings. Rollers 32 and 33 will also be equipped with rubber tires to minimize the noise produced by the action of the carriage plate.

Having thus illustrated and described my invention, I claim:

In windshield wiper mechanism, an elongated stationary horizontal hood of angle iron formation in cross section, said hood having in cross-section an upwardly arched portion and a downwardly arched portion, forming runways, a carriage having a plurality of wheels engaging said runways to travel therealong, a windshield wiper element mounted on said carriage, and means for reciprocating said carriage.

LAWRENCE W. WATERS.